United States Patent [19]

Suzuki et al.

[11] Patent Number: 5,065,718

[45] Date of Patent: Nov. 19, 1991

[54] ENGINE IDLE CONTROL VALVE

[75] Inventors: Atsushi Suzuki, Obu; Toshio Kondo, Kariya, both of Japan

[73] Assignee: Nippondenso Co., Ltd., Kariya, Japan

[21] Appl. No.: 568,133

[22] Filed: Aug. 16, 1990

[30] Foreign Application Priority Data

Aug. 20, 1989 [JP] Japan .................................. 1-214548
Jul. 17, 1990 [JP] Japan .................................. 2-188266

[51] Int. Cl.[5] ........................ F02M 3/00; F02B 23/00; F16K 31/12

[52] U.S. Cl. .................................... 123/339; 123/585; 251/30.03

[58] Field of Search .................... 123/339, 479, 198 D, 123/585, 586, 587, 588, 589; 251/309, 311, 312, 319-323, 325, 30.03

[56] References Cited

U.S. PATENT DOCUMENTS

| | | | |
|---|---|---|---|
| 4,494,517 | 1/1985 | Kratt et al. | 123/585 |
| 4,779,590 | 10/1988 | Uthoff, Jr. | 123/339 |
| 4,785,779 | 11/1988 | Takao et al. | 123/339 |
| 4,823,750 | 4/1989 | Niida et al. | 123/339 |
| 4,873,954 | 10/1989 | Codling | 123/339 |
| 4,875,456 | 10/1989 | Tomisawa | 123/585 |
| 4,879,983 | 11/1989 | Shimomura et al. | 123/339 |
| 4,887,570 | 12/1989 | Meicher | 123/339 |
| 4,909,213 | 3/1990 | Mezger et al. | 123/339 |
| 4,940,031 | 7/1990 | Mann | 123/339 |
| 4,962,737 | 10/1990 | Brand et al. | 123/339 |
| 4,966,112 | 10/1990 | Shimomura et al. | 123/339 |

FOREIGN PATENT DOCUMENTS

| | | | |
|---|---|---|---|
| 59-150939 | 8/1984 | Japan | 123/339 |
| 60-21536 | 2/1985 | Japan | 123/339 |
| 60-224947 | 11/1985 | Japan | 123/339 |
| 60-40837 | 12/1985 | Japan | 123/339 |
| 62-182447 | 8/1987 | Japan | 123/339 |
| 63-97840 | 4/1988 | Japan | 123/339 |
| 63-186932 | 8/1988 | Japan | 123/339 |
| 1-11339 | 1/1989 | Japan | 123/339 |
| 1-22841 | 2/1989 | Japan | 123/339 |

*Primary Examiner*—R. A. Nelli
*Attorney, Agent, or Firm*—Cushman, Darby & Cushman

[57] ABSTRACT

An engine control valve is disclosed which comprises a first bypass passage for introducing auxiliary air flow to an engine from an upstream side of an intake throttle valve disposed in an air intake pipe of the engine while bypassing the intake throttle valve; a second bypass passage having an inlet port in communication with an outlet port of the first bypass passage, for introducing the auxiliary air flow, introduced through the inlet port, to a downstream side of the intake throttle valve; a valve body for changing an opening area of at least one of the outlet port of the first bypass passage and the inlet port of the second bypass passage, thereby adjusting an amount of the auxiliary air flow to be introduced from the upstream side to the downstream side of the intake throttle valve; and a drive unit for driving the valve body in accordance with a drive signal outputted from the control unit. When a maximum drive signal is inputted into the drive unit, the opening area of at least one of the outlet port of the first bypass passage and the inlet port of the second bypass passage is throttled so that a predetermined amount of the auxiliary air flow smaller than a maximum amount of the auxiliary air flow may be introduced into the downstream side of the intake throttle valve.

26 Claims, 8 Drawing Sheets

ENGINE IDLE CONTROL VALVE

BACKGROUND OF THE INVENTION

The present invention relates to an engine idle control valve for controlling an amount of auxiliary air flow to be supplied to an engine from a bypass passage which bypasses an intake throttle valve during an idle condition of the engine, and more particularly to a fail-safe for the engine idle control valve.

A conventional engine idle control valve of such type suffers from the following problem. In the case where a drive signal is not supplied due to the fact that, for example, a signal line through which the drive signal is supplied is broken down, the idle control valve is held under a fully closed condition so that almost no auxiliary air is supplied through a bypass passage to thereby reduce an engine RPM (revolutions per minute) and to lead to an engine stall.

Conventionally, there has been disclosed an engine idle control valve in which, in order to overcome the above-noted problem, even if the drive signal is supplied to the engine idle control valve, as shown in FIG. 8, such an amount Q1 of auxiliary air flow in order that any engine stall is not caused is supplied through the bypass passage (see, for example, Japanese Patent Unexamined Publication 59-150939 (i.e. U.S. Pat. No. 4,494,517, DE-)S 3, 23 44 68)).

However, in such an engine idle control valve, in the case where the signal line through which the drive signal is supplied thereto would be short-circuitted with, for example, a battery voltage line, a battery voltage (held at about 14V), i.e., an maximum drive signal is always supplied to the control valve. Accordingly, the engine idle control valve is held under the fully opened condition. As a result, the amount of auxiliary air flow to be supplied through the bypass passage is kept at the maximum amount $Q_{max}$ of auxiliary air flow. Accordingly, the engine RPM is abnormally increased.

SUMMARY OF THE INVENTION

In view of the foregoing defects, an object of the invention is to provide an idle control valve for an engine in which even if a signal line for supplying a drive signal to the valve would be short-circuitted or broken down, a predetermined amount of auxiliary air flow is supplied from the bypass passage to the engine.

According to the present invention, there is provided an engine idle control valve comprising:

first bypass passage means having an outlet port for introducing auxiliary air flow to an engine from an upstream side of an intake throttle valve disposed in an air intake pipe of the engine while bypassing the intake throttle valve;

second bypass passage means having an inlet port in communication with said outlet port of the first bypass passage means, for introducing the auxiliary air flow, introduced through the inlet port, to a downstream side of the intake throttle valve;

a valve body for changing an opening area of at least one of the outlet port of the first bypass passage means and the inlet port of the second bypass passage means, thereby adjusting an amount of the auxiliary air flow to be introduced from the upstream side to the downstream side of the intake throttle valve; and drive means for driving the valve body in accordance with a drive signal;

wherein, when a maximum drive signal is inputted into said drive means, the opening area of at least one of the outlet port of said first bypass passage means and the inlet port of the second bypass passage means is throttled so that a predetermined amount of the auxiliary air flow smaller than a maximum amount of auxiliary air flow may be introduced into the downstream side of the intake throttle valve.

With such an arrangement, an amount of the auxiliary air flow is adjusted by changing an opening area of the outlet port of the first bypass passage and the inlet port of the second bypass passage with the valve body driven by the drive means.

Accordingly, it is possible to control the RPM of the engine to a target RPM by controlling the valve body to adjust an amount of the auxiliary air flow under the idle condition.

In the case where the maximum drive signal is inputted into the drive means, the opening area of the outlet port of the first bypass passage and the inlet port of the second bypass passage is such that a predetermined amount of the auxiliary air flow may be supplied.

DESCRIPTION OF THE PREFERRED EMBODIMENTS

An embodiment of the invention will now be described with reference to the accompanying drawings.

Figure 9:
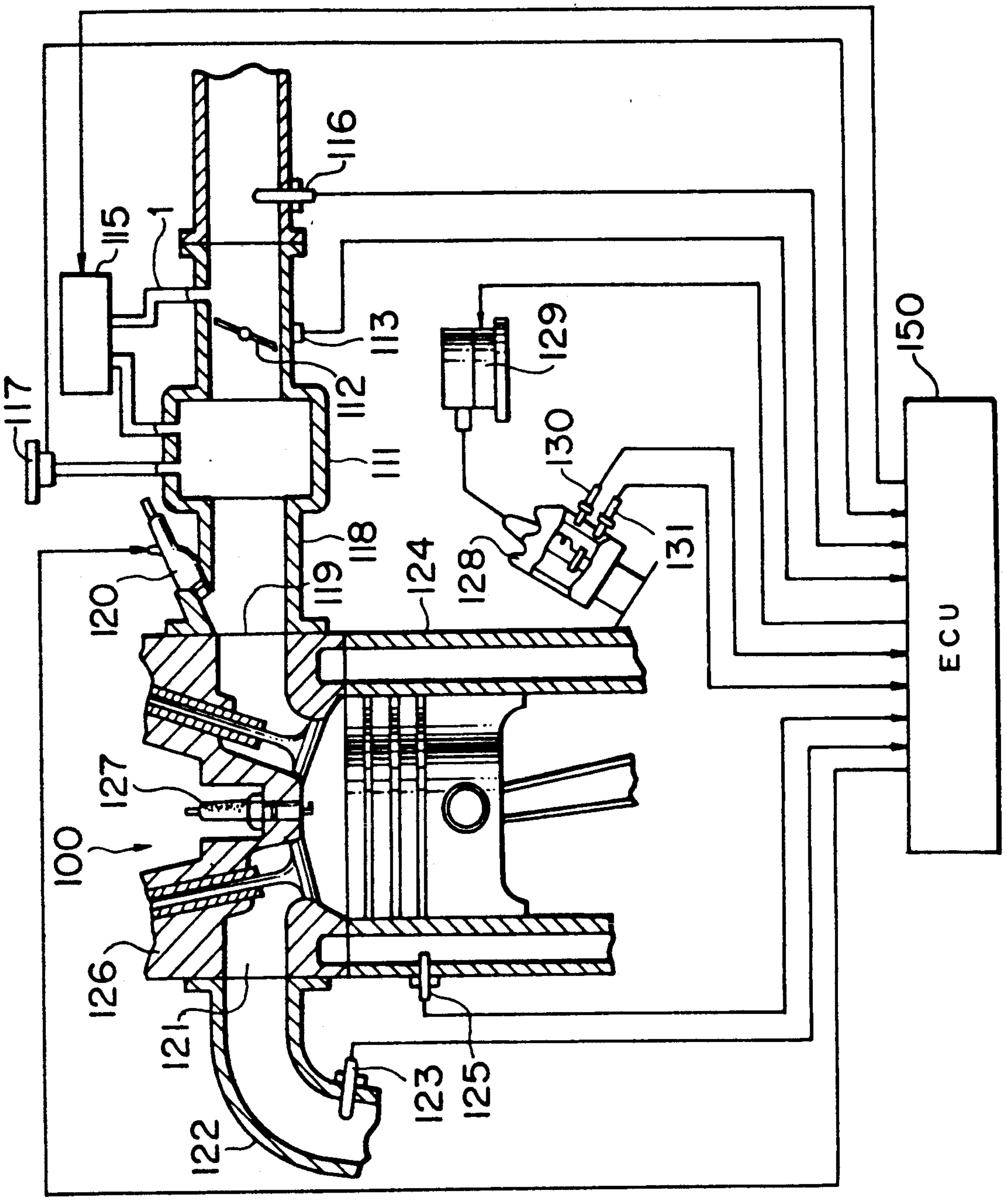
FIG. 9 is a schematic view showing an engine and associated components in accordance with the first embodiment.

FIG. 9 is a schematic view showing an engine 100 and its associated equipment, in which an idle control or the like is effected by an idle control valve 115.

In an intake system of the engine 100, an intake throttle valve 112 is disposed upstream of a surge tank 111, and an idle switch 113 which is turned on under the fully closed condition of the intake throttle valve 112 is arranged. A bypass passage 1 is provided so as to supply auxiliary air flow from a portion upstream of the intake throttle valve 112 to the surge tank 111 downstream of the intake throttle valve 112 while bypassing the intake throttle valve 112. An idle control valve 115 is provided in the bypass passage 1 for controlling an amount Q of the auxiliary air flow.

Further, a temperature sensor 116 for detecting a temperature of the intake air is provided upstream of the intake throttle valve 112, and a pressure sensor 117 for detecting a pressure of the pressure is provided downstream of the intake throttle valve 112.

The surge tank 111 is in fluid communication with a combustion chamber of the engine 100 through an intake manifold 118 and an intake port. A fuel injection valve 120 is disposed so as to project into the intake manifold 118 for each cylinder.

On the other hand, the combustion chamber of the engine 100 is connected to a three-component catalyst (not shown) through an exhaust port 121 and exhaust manifold 122. An oxygen sensor 123 for detecting a residual oxygen concentration of the exhaust gas and for outputting an air/fuel ratio signal is mounted in the exhaust manifold 122. A water temperature sensor 125 is mounted on an engine block 124 so as to project into a water jacket through the engine block 124 for detecting a temperature of a cooling water for the engine.

Furthermore, a spark plug 127 is mounted in each cylinder so as to project into the combustion chamber through a cylinder head 126. The spark plug 127 is connected through a distributor 128 and an ignitor 129 to an electronic control unit (ECU) 150 which is composed of a micro computer and the like. A cylinder discrinating sensor 130 Composed of a signal rotor fixed to a distributor shaft and a crank angle sensor 131 composed of a pickup fixed to a distributor housing are mounted within the distributor 128. In case of a six-cylinder engine, the cylinder discriminating sensor 130 is adapted to output a cylinder discrimination signal at every crank angle of, for example, 720 degrees, and the crank angle sensor 131 is adapted to output an RPM signal at every crank angle of, for example, 30 degrees.

Figure 10:
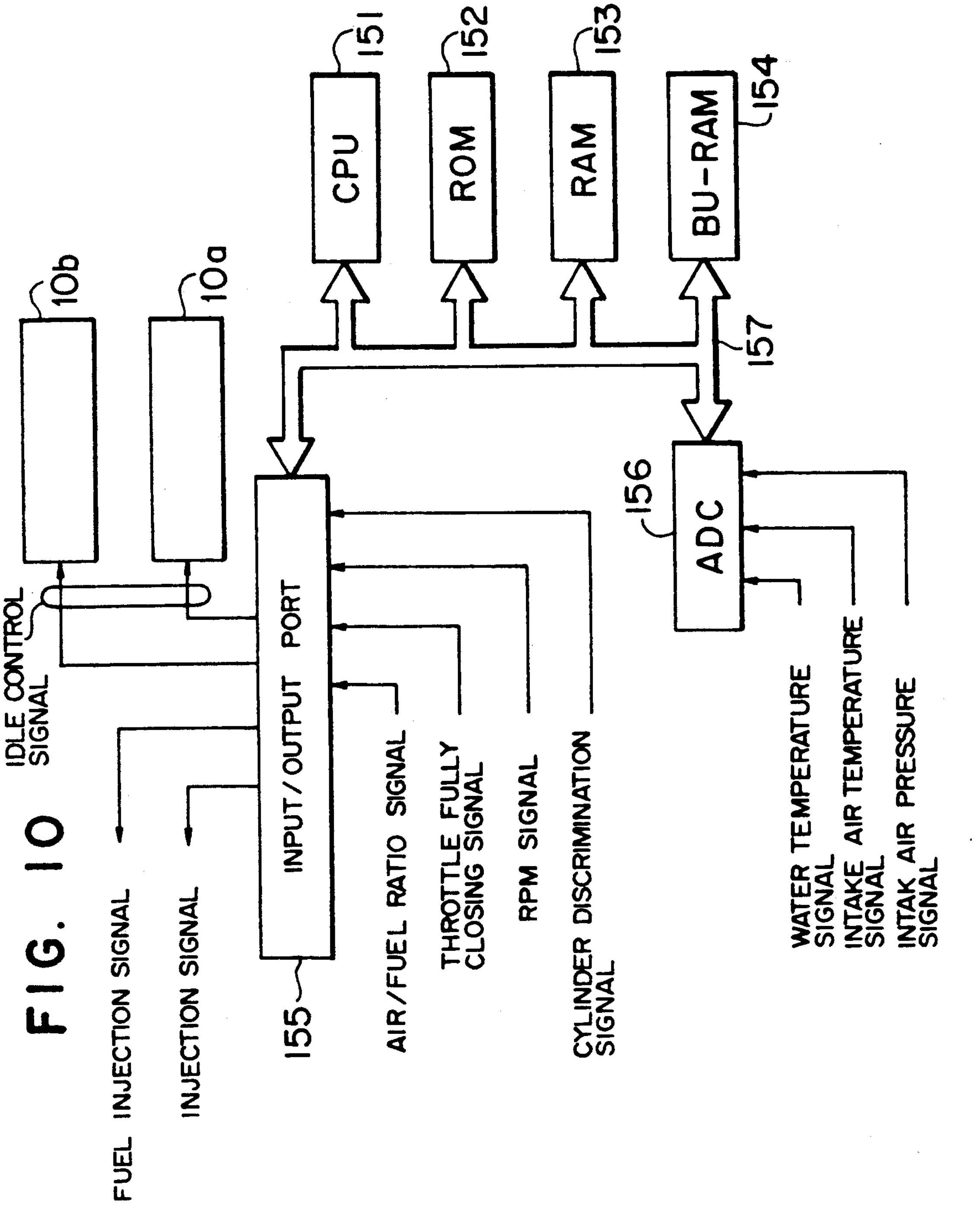
FIG. 10 is a block diagram of an ECU.

As shown in FIG. 10, the ECU 150 includes a central processing unit (CPU) 151, a read only memory (ROM) 152, a random access memory (RAM) 153, a battery-backup RAM (Bu-RAM) 154, an input/output port 155, an analog/digital converter (ADC) 156, a bus 157 such as data bus and control bus for connecting these components. Inputted into the input/output port 155 are the above-described cylinder discriminating signal, RPM signal, throttle fully closed signal, air/fuel ratio signal and the like. The input/output port 155 outputs an idle control valve signal of the idle control valve 115 for controlling an opening area of the bypass passage 1, a fuel injection signal for opening/closing the fuel injection valve 120, an ignition signal for turning on/off the igniter 129, and the like. Drive circuits drive the idle control valve 115, the fuel injection valve 120 and the ignitor 129 in accordance with these associated output signals, respectively.

Analog signals like the intake pressure signal, the intake temperature signal and the water temperature signal are inputted into the A/D converter 156 which in turn converts these analog signals into digital signals in order in accordance with the command of the CPU 151.

Figure 1:
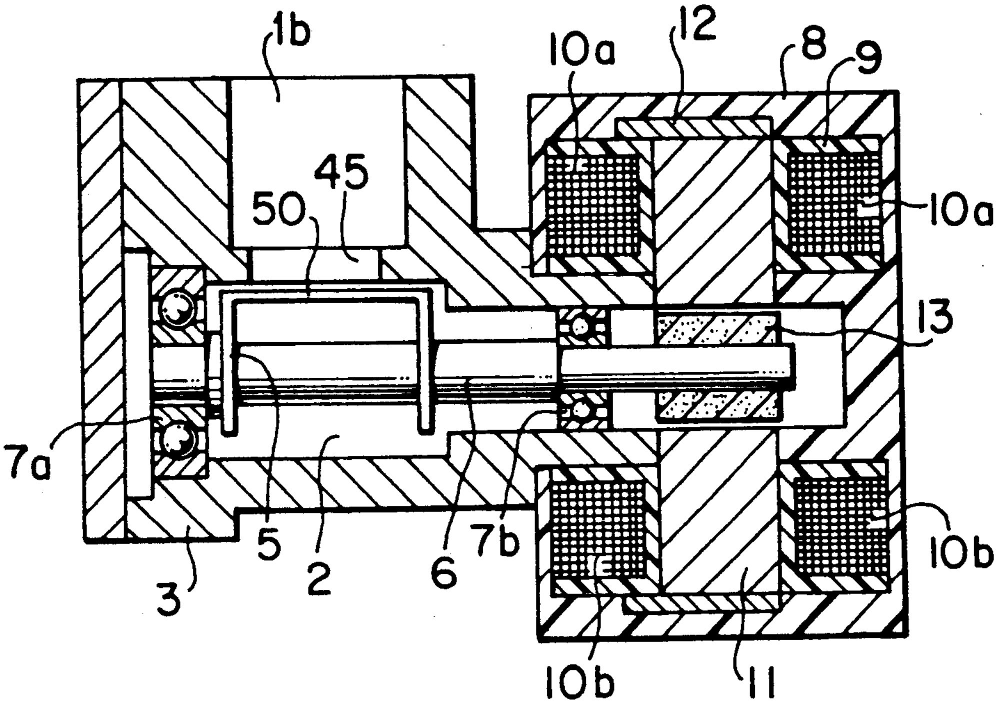
FIG. 1 is a longitudinal sectional view showing a rotary solenoid type idle control valve in accordance with a first embodiment of the invention.

A first embodiment of the foregoing idle control valve 115 will be explained in more detail. FIG. 1 is a schematic view showing the idle control valve 115 in which a rotary solenoid is used as a drive circuit.

A first bypass passage la connected upstream of the intake throttle valve 112 and a second bypass passage 1*b* connected downstream of the intake throttle valve 112 are communicated with each other through a rotary space portion 2. These bypass passages are formed in a housing 3. A rotor 5 as a valve body formed with a part of a cylindrical surface in conformity with and in correspondence with a valve seat portion 42 having a part of the cylindrical surface formed at an outlet lower end of the first bypass passage 1*a* and a valve seat portion 43 formed at the inlet lower end of the second bypass passage 1*b* is fixed to a rotary shaft 6.

In the valve seat portion 42, an outlet port 44 having an opening area smaller than an area of the valve portion 50 of the rotor 5 is formed to constitute an outlet portion of the first bypass passage 1*a*. On the other hand, in the valve seat portion 43, an inlet port 45 is formed to constitute an inlet portion of the second bypass passage 1*b*. A sum of the opening area of the port 45 and an area of wall between the outlet port 44 and the inlet port 45 is selected so as to be larger than the surface area of the valve portion 50 of the rotor 5. In addition, the opening area of the inlet port 45 is selected so as to be larger than the surface area of the valve portion 50 of the rotor 5.

The rotary shaft 6 is smoothly rotatable within the rotary space portion 2 together with the rotor 5 by a space between the valve portion 50 of the rotor 5 and the valve seat portions 42 and 43 and two bearings 7*a* and 7*b* interposed between the rotary shaft 6 and the housing 3.

A drive device for drivingly rotating the rotor 5 is provided at an end portion of the housing 3 in the axial direction of the rotary shaft 6. The drive device is received within a cover 8 made of synthetic resin and fixed to the end portion of the housing 3. More specifically, two kinds of coils 10*a* and 10*b* are provided within the cover 8 through sleeves 9 made of synthetic resin, and one of these coils 1*a* and 10*b* is adapted to impart a torque in the valve opening direction while the other is adapted to impart a torque in the valve closing direction. Namely, the rotor 5 is positioned in accordance with a duty ratio of voltage supplied to the coils 10*a* and 10*b*. An ferric member 12 is disposed close to an outer peripheral portion of a stainless steel member 11 disposed inside of the coils 10*a* and 10*b*. A permanent magnet 13 is pressingly fixed to the end portion of the rotary shaft 6 through the stainless steel member 11 and a gap. Therefore, torque is generated by a magnetic field of the coils 10*a* and 10*b*, whereby the opening areas of the outlet port 44 and the inlet port 45 are varied in accordance with the rotation of the rotor 5 integrated with the rotary shaft 6. In accordance with the change of the opening areas, the amount Q of the auxiliary air flow passing through the first and second bypass passages bypassing the intake throttle valve from the upstream portion to the downstream portion is also varied.

In the ECU 150, a target RPM is set in correspondence with the operational condition of the engine 100 detected by the foregoing various sensors under the idle condition of the engine 100. The duty ratio for the coils 10*a* and 10*b* in correspondence with the opening area needed for supplying the amount Q of the auxiliary air flow so that the RPM reaches the target RPM is calculated. A voltage pulse is supplied to the coils 10*a* and 10*b* corresponding to the duty ratio, to thereby control the RPM to the target RPM under the idle condition of the engine 100.

Figure 2:
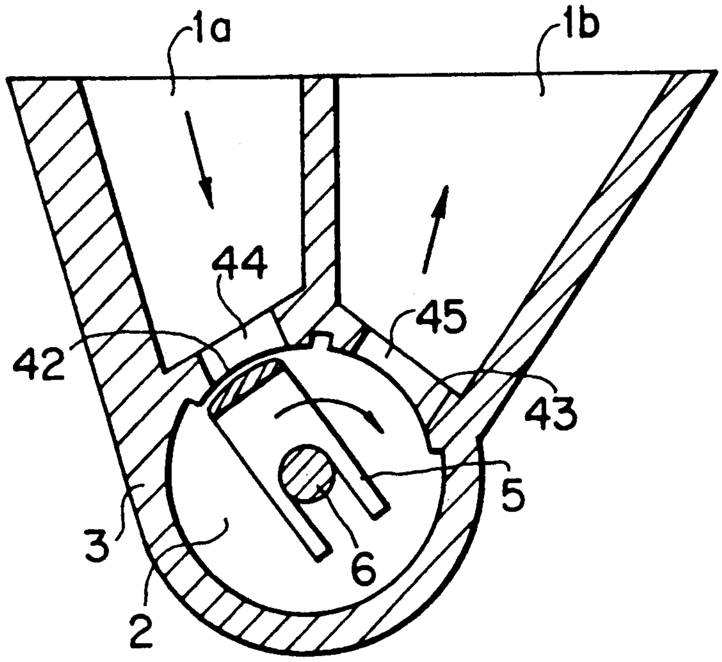
FIG. 2 is a cross-sectional view showing the control valve, shown in FIG. 1, kept under the deenergized condition.

Under the deenergized condition of the coils 10*a* and 10*b*, i.e., the condition where the voltage pulse is not supplied to the coils 10*a* and 10*b* (at the duty ratio of 0 %), the rotor 5 is controlled to the position shown in FIG. 2. In this position of the rotor 5, the outlet port 44 of the outlet portion of the first bypass passage 1*a* is almost closed by the valve portion 50 but the outlet port 44 is opened at such an opening area that a first amount Q1 of auxiliary air flow is kept to maintain the engine 100 at a desired RPM (for example, 1500 to 2000 rpm in case of the embodiment).

Figure 6:
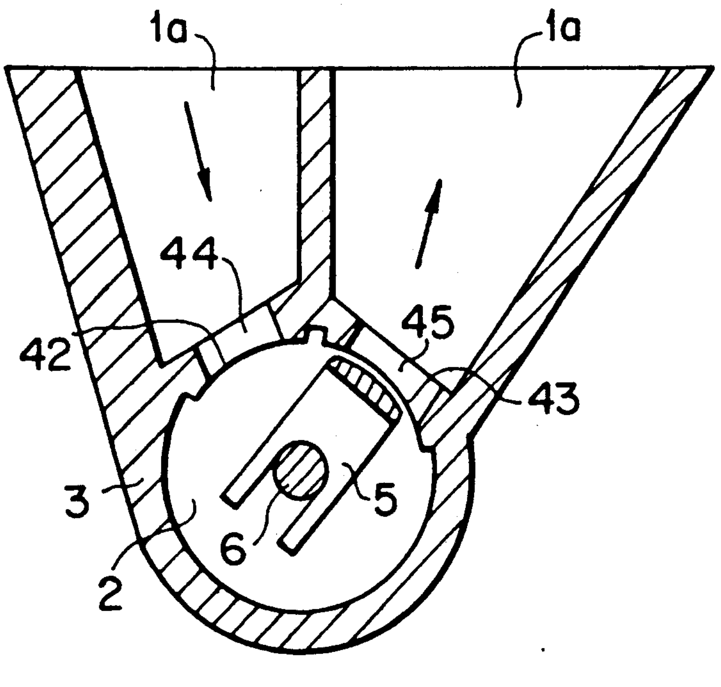
FIG. 6 is a cross-sectional view showing the control valve, shown in FIG. 1, at a duty ratio of d% or more.

Also, in the case where the duty ratio of the coils 10*a* and 10*b* is at maximum (100%), the rotor 5 is controlled to the position shown in FIG. 6. In this position of the rotor 5, the inlet port 45 of the inlet portion of the second bypass passage is almost covered by the valve portion 50 but the inlet port 45 is opened at an opening area to ensure a second amount Q2 of the auxiliary air flow so that the RPM is kept at such a level that there would be fear that the vehicle would be out of control.

The operation of the idle control valve 115 will be explained with reference to FIGS. 2 through 7.

First of all, in the case of the duty ratio of 0%, the rotary valve 5 is controlled to the position shown in FIG. 2. Under this condition, the first amount Q1 of the auxiliary air flow is supplied.

Figure 3:
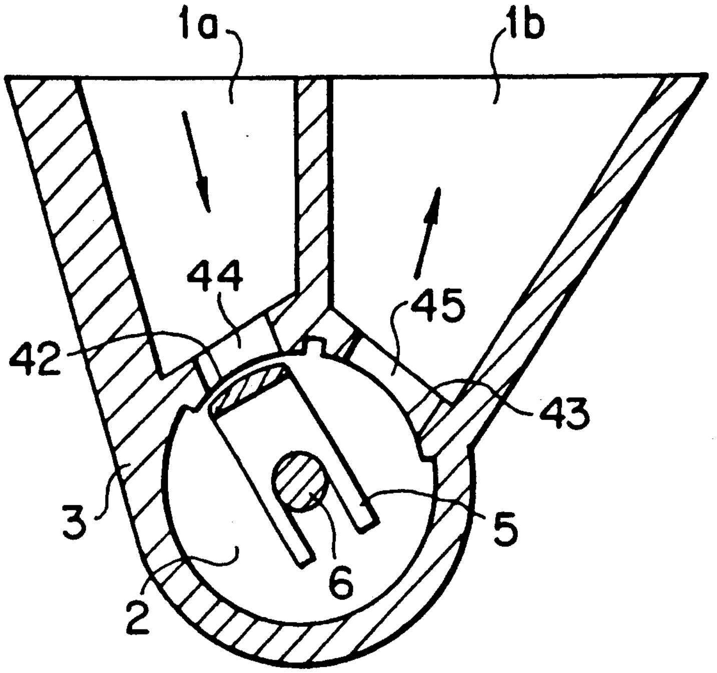
FIG. 3 is a cross-sectional view showing the control valve, shown in FIG. 1, at a duty ratio of a%.

As the duty ratio is increased, the rotor 5 is rotated in the direction indicated by the arrow in FIG. 2. Accordingly, the opening of the outlet port 44 is decreased, and an amount Q of the auxiliary air flow is decreased. Thereafter, the rotor 5 completely covers the outlet port 44 as shown in FIG. 3 (duty ratio of a%). Under this condition, an amount of the auxiliary air flow is a leakage air amount (i.e., an amount of minimum auxiliary flow) Q0.

Figure 4:
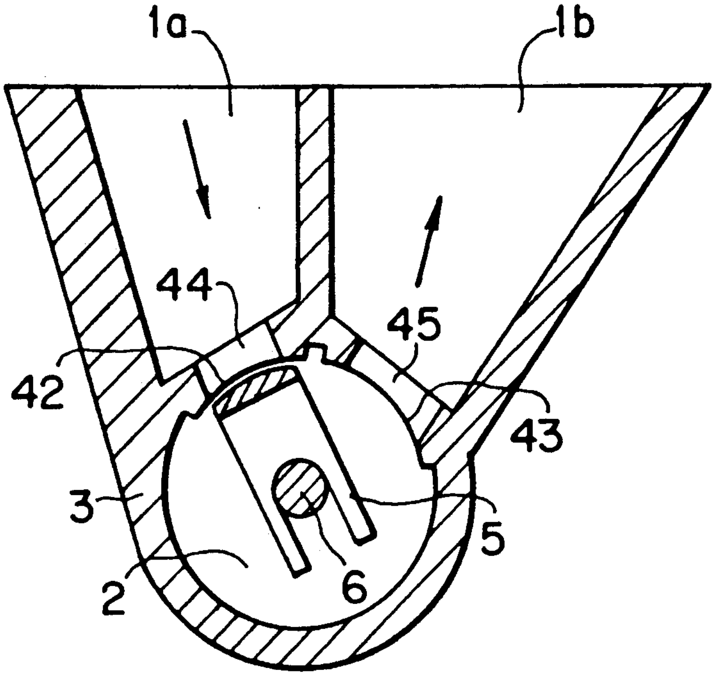
FIG. 4 is a cross-sectional view showing the control valve, shown in FIG. 1, at a duty ratio of b%.
Figure 5:
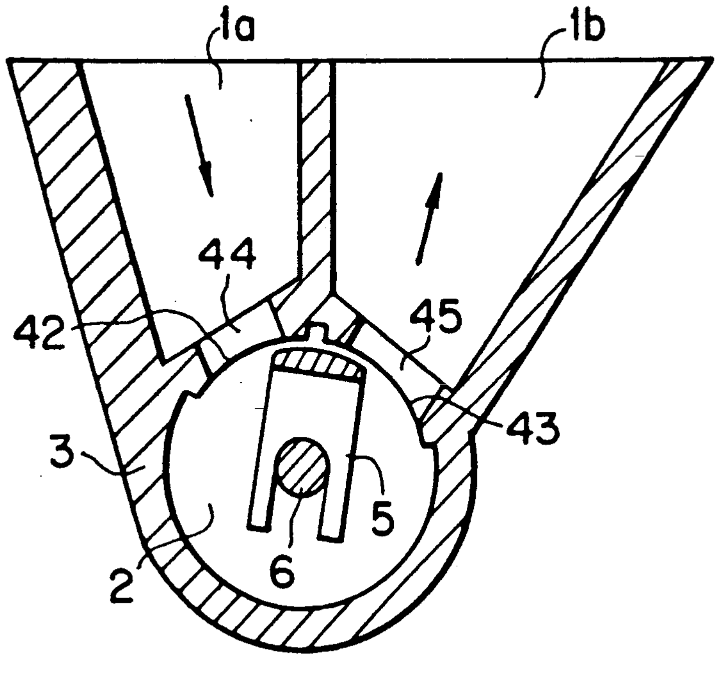
FIG. 5 is a cross-sectional view showing the control valve, shown in FIG. 1, at a duty ratio of c%.

As described before, since the area of the valve portion 50 is larger than the area of the outlet port 44, an amount Q of the auxiliary air flow is kept at the minimum amount Q0 of the auxiliary air flow from the position shown in FIG. 3 (duty ratio of a%) to the position shown in FIG. 4 (duty ratio b%)

As the duty ratio is further increased, the opening area of the outlet port 44 will be gradually increased so that an amount Q of the auxiliary air flow will also be increased gradually.

An amount Q of the auxiliary air flow depends upon the smaller one of the opening areas of the outlet port 44 and the inlet port 45. Accordingly, an amount Q of the auxiliary air flow depends upon the opening area of the outlet port 44 until the position shown in FIG. 5 (duty ratio of c%) is reached, that is, until the opening area of the outlet port 44 is equal to that of the inlet port 45. Accordingly, in the range of the duty ratio from b% to c%, the larger the duty ratio, the larger an amount Q of the auxiliary air flow will become. Under the normal idle RPM control, an amount Q of the auxiliary air flow is adjusted in this range so that the RPM is controlled to the target RPM.

When the duty ratio of c% is exceeded, the opening area of the inlet port 45 is smaller than that of the outlet port 44. In this condition, an amount Q of the auxiliary air flow depends upon the opening area of the inlet port 45. The rotor 5 is rotated so that, the larger the duty ratio, the smaller the opening area of the inlet port 45 will become. Accordingly, above the duty ratio of c%, the larger the duty ratio, an amount Q of the smaller the auxiliary air flow will become.

Then, at the duty ratio of d%, the rotor 5 is controlled to the position shown in FIG. 6. The rotor 5 cannot follow the voltage pulse of the duty ratio equal to or larger than d%. The rotor 5 cannot rotate in the arrow direction indicated in FIG. 2 beyond the position shown in FIG. 6. Accordingly, at the duty ratio equal to or larger than d%, the opening area of the inlet port 45 is kept unchanged so that an amount Q2 of the auxiliary air flow is supplied to the engine.

Figure 7:
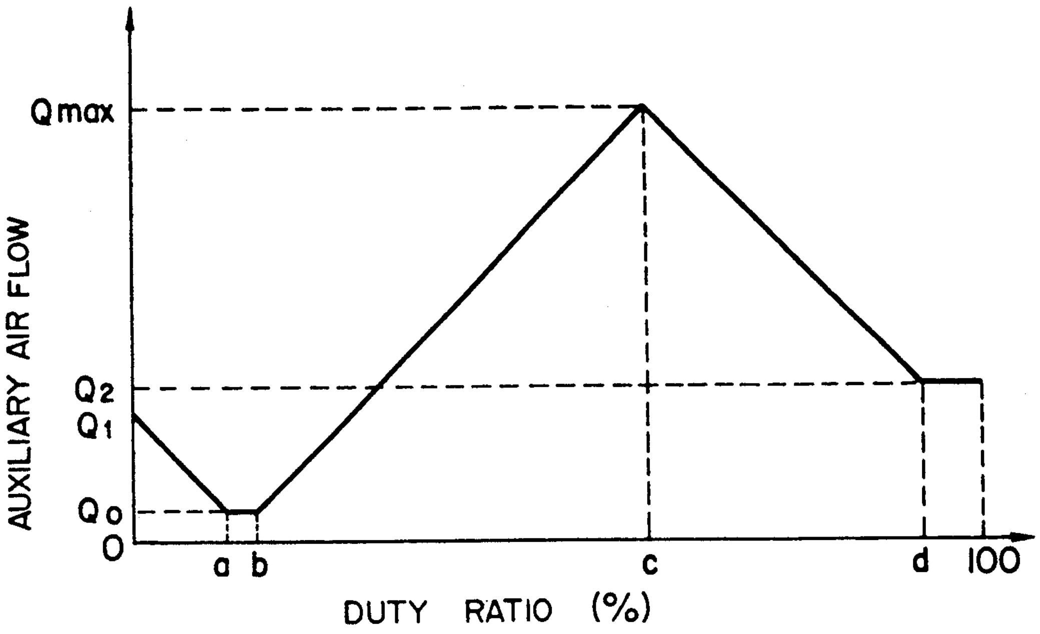
FIG. 7 is a graph showing characteristics of the duty ratio and an amount of auxiliary air flow of the idle control valve according to the first embodiment.
Figure 8:
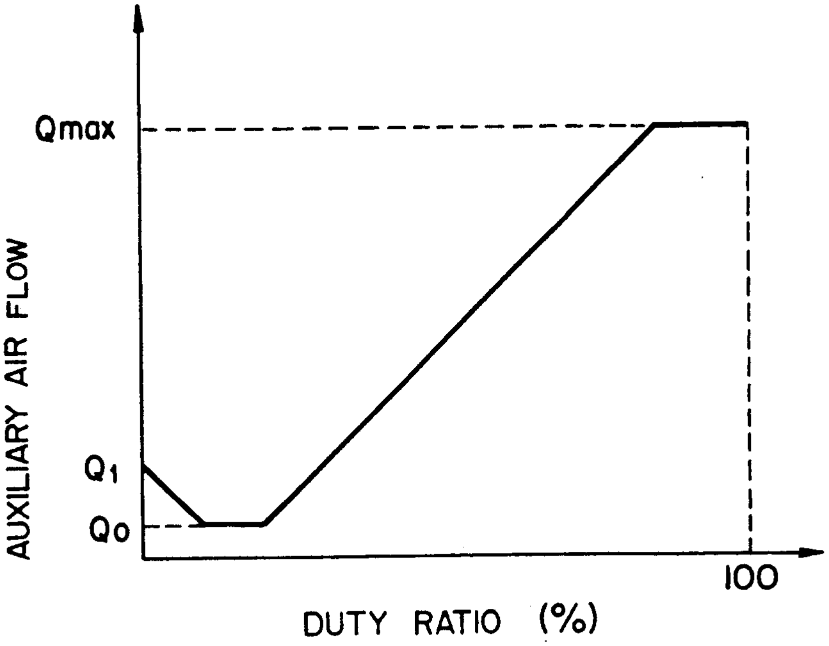
FIG. 8 is a graph showing characteristics of the duty ratio and an amount of auxiliary air flow of a conventional idle control valve.

The relationship between an amount Q of the auxiliary air flow and the duty ratio in the first embodiment is shown in FIG. 7.

As is apparent from the relationship shown in FIG. 7, at the duty ratio of 0%, if one of the signal lines for supplying the voltage pulse to, for example, the coils 10*a* and 10*b*, i.e., the signal line for generating the torque in the valve opening direction is broken down or if one of the signal lines for supplying the voltage pulse to the coils 10*a* and 10*b*, that is, the signal line for generating torque in the valve closing direction is broken down, the rotor 5 is kept at the position shown in FIG. 2, so that an amount Q of the auxiliary air flow to be supplied to the engine 100 is equal to the amount Q1 of the first bypass passage. Also, at the duty ratio of 100%, if one of the signal lines for supplying the voltage pulse to, for example, the coils 10*a* and 10*b*, that is, the signal line for generating torque in the valve opening direction is broken down, or if one of the signal lines for supplying the voltage pulse to the coils 10*a* and 10*b*, that is, the signal line for generating the torque in the valve closing direction is broken down, the rotor 5 is kept at the position shown in FIG. 6, so that an amount Q of the auxiliary air flow to be supplied to the engine 100 is equal to the amount Q2 of the second bypass passage. On the other hand, under the normal idle control, the duty ratio is controlled in the range from b% to c%.

Accordingly, even if an abnormality such as a breakdown and a short-circuit is generated in the signal line for supplying the voltage pulse to the coils 10*a* and 10*b*, an amount Q of the auxiliary air flow to be supplied to the engine 100 is not the minimum auxiliary air amount Q0 or the maximum amount $Q_{max}$ of the auxiliary air flow but may be kept at amounts Q1, Q2 of the first or second auxiliary air flows. As described before, amounts Q1 and Q2 of the first and second auxiliary air flows are such amounts of air flows for desired RPMs that the engine would not be stalled and that the vehicle will not run out of control.

Accordingly, even if the signal lines for supplying the voltage pulse for energizing the coils are broken down or short-circuitted, it is possible to prevent the generation of the engine stall or to prevent the vehicle from running out of the control due to the increase in RPM.

Also, in order to continuously move the rotor 5 between the outlet port 44 and the inlet port 45 in accordance with the drive signal to change both the opening areas of the outlet port 44 and the outlet port 45, and in order to keep the opening areas at which amounts Q1 or Q2 of the first or second auxiliary air flows may be supplied when the signal lines are broken down, it is unnecessary to provide special components such as return springs.

Such characteristics are obtained that, under the duty ratio of a% or less, as the duty ratio is smaller, an amount Q of the auxiliary air flows to be supplied to the engine 100 is gradually increased. Accordingly, even the voltage pulse of the duty ratio a% or less would be inputted due to the abnormality of the ECU 150 or the like, an amount of the auxiliary air flow to be supplied to the engine 100 is controlled to an amount of the air flow around the minimum amount Q0 of the auxiliary air flow. It is thus possible to prevent the increase of the RPM.

On the other hand, above the duty ratio of c%, the larger the duty ratio, the smaller an amount Q of the auxiliary air flow to be supplied to the engine will become. Accordingly, even if a voltage pulse of the duty ratio c% or more would be inputted due to the abnormality of the ECU 150 or the like, an amount of the auxiliary air flow to be supplied to the engine 100 is controlled to an amount of air flow around the maximum amount $Q_{max}$ of the auxiliary air flow. It is thus possible to prevent decrease of the RPM.

Subsequently, a linear solenoid type idle control valve in accordance with a second embodiment will now be described with reference to FIGS. 11 to 15.

FIGS. 11 to 14 show positions of a valve body 90 corresponding to the duty ratio of the voltage pulse supplied to a linear solenoid 98. In the same manner as that of the first embodiment, a control valve has a first bypass passage 92 in communication with a portion upstream of the intake throttle valve 112, a second bypass passage in communication with a portion downstream of the intake throttle valve 112, and a space 96.

Further, a valve body 90 mounted on an end of a drive shaft 91 to be driven by the linear solenoid is provided within the space 96. In addition, a spring 97 is provided for biasing the valve body 90 in the fully closing direction. The opening areas of the outlet port 92*a* of the first bypass passage 92 and the inlet port 93*a* of the second bypassing passage 93 are adjusted to thereby control an amount Q of the auxiliary air flow to be supplied to the engine 100. A projection 94 for defining the fully closed position for limiting the movement of the valve body 90 is provided on one of walls of the space 96, and a projection 95 for defining the fully open position is provided on the other wall of the space 96.

In the linear solenoid type idle control valve 115, the valve body 90 is shifted to a balance position, with a spring 97, of a magnetic attracting force generated in correspondence with a magnitude of the voltage pulse supplied to the linear solenoid 98. Then, in the same manner as that of the first embodiment, the supplied voltage pulse is controlled to move the valve body 90 to a desired position, thereby controlling the opening areas of the outlet port 92*a* and the inlet port 93*a* to adjust an amount Q of the auxiliary air flow.

Figure 11:
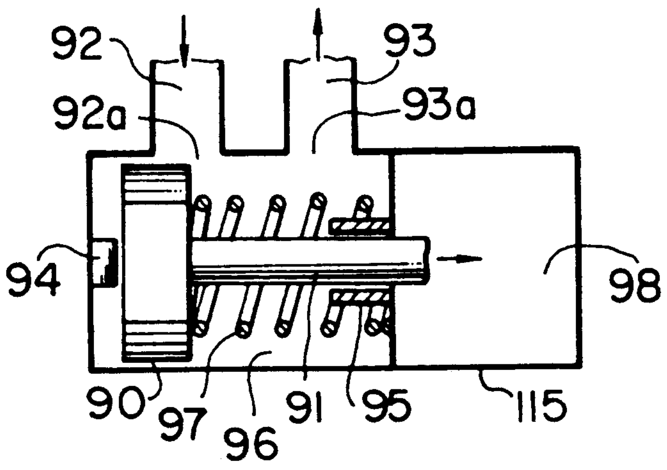
FIG. 11 is a sectional view showing an idle control valve in accordance with a second embodiment under a deenergized condition.

In the case where the duty ratio of the voltage pulse is 0%, that is, no voltage pulse is supplied, the valve body 90 is controlled to a position shown in FIG. 11. Under this condition, the valve body 90 is pressed against the projection 94 by the spring 97, and the outlet port 92*a* is controlled to a predetermined area so that an amount Q1 of a first auxiliary air flow is supplied to the engine.

Figure 12:
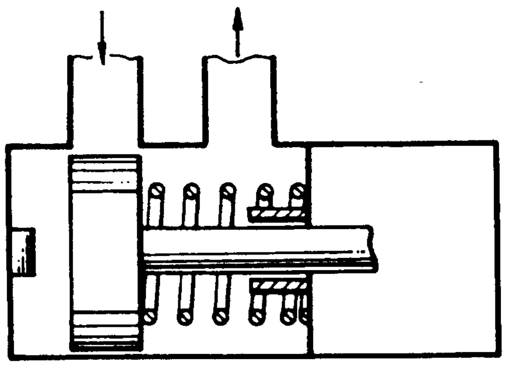
FIG. 12 is a sectional view showing the idle control valve, shown in FIG. 11, at the duty ratio A%.
Figure 13:
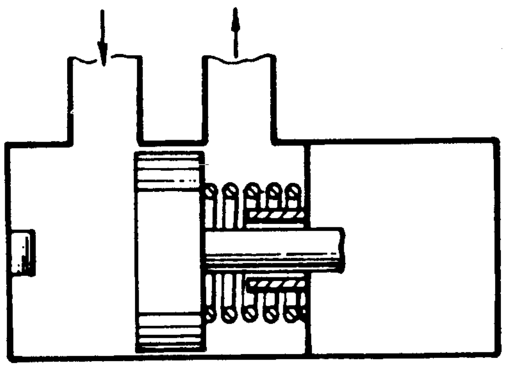
FIG. 13 is a sectional view showing the idle control valve, shown in FIG. 11, at the duty ratio B%.

Then, when the duty ratio is increased, the drive shaft 91 is moved in a direction indicated by an arrow in FIG. 11, i.e., in the axial direction of the drive shaft 91. Accordingly, the opening area of the outlet port 92 is gradually decreased, an amount Q of the auxiliary air flow will be gradually decreased. Thereafter, the valve body 90 fully covers the outlet port 92*a* as shown in FIG. 12 (duty ratio A%). Under this condition, an amount Q of the auxiliary air flow is at the minimum amount Q0 of the auxiliary air flow.

Also in the second embodiment, since the valve body 90 is larger in size than the outlet port 92*a* in the same manner as in the first embodiment, an amount Q of the auxiliary air flow in the position where the valve body 90 is located as shown in FIG. 12 (duty ratio A% is at the minimum amount Q0 of the auxiliary air flow.

Further, as the duty ratio is increased, the opening area of the outlet port 92*a* is gradually increased to gradually increase an amount Q of the auxiliary air flow.

An amount Q of the auxiliary air flow depends upon smaller one of the opening areas of the outlet port 92*a* and the inlet port 93*a*. Accordingly, an amount Q of the auxiliary air flow depends upon the opening area of the outlet port 92*a* until the valve body 90 is located to the position shown in FIG. 13 (duty ratio B%), that is, the opening area of the outlet port 92*a* is equal to that of the inlet port 93*a*. As a result, the larger the duty ratio from the duty ratio A% to the duty ratio B%, the larger an amount Q of the auxiliary air flow will become. Under the normal idle RPM control, the auxiliary air amount Q is adjusted in the range of the duty ratio, to thereby control the RPM to a target RPM.

When the duty ratio is equal to or larger than B%, the opening area of the inlet port 93*a* is smaller than that of the outlet port 92*a*. Thus, an amount Q of the auxiliary air flow depends upon the opening area of the inlet port 93*a*. The valve body 90 is moved so that as the duty ratio is increased, the opening area of the inlet port 93*a* is smaller. Accordingly, when the duty ratio is equal to or larger than B%, the larger the duty ratio, the smaller an amount Q of the auxiliary air flow will become.

Figure 14:
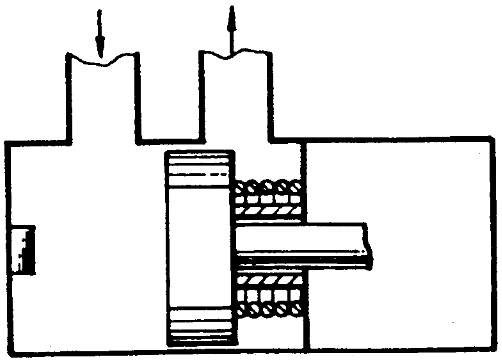
FIG. 14 is a sectional view showing the idle control valve, shown in FIG. 11, at the duty ratio of 100% or more.

At the duty ratio of 100%, the valve body 90 is controlled to the position shown in FIG. 14. Accordingly, at the duty ratio of 100%, the opening area of the inlet port 93*a* is controlled to the position where an amount Q2 of the auxiliary air flow is supplied.

Figure 15:
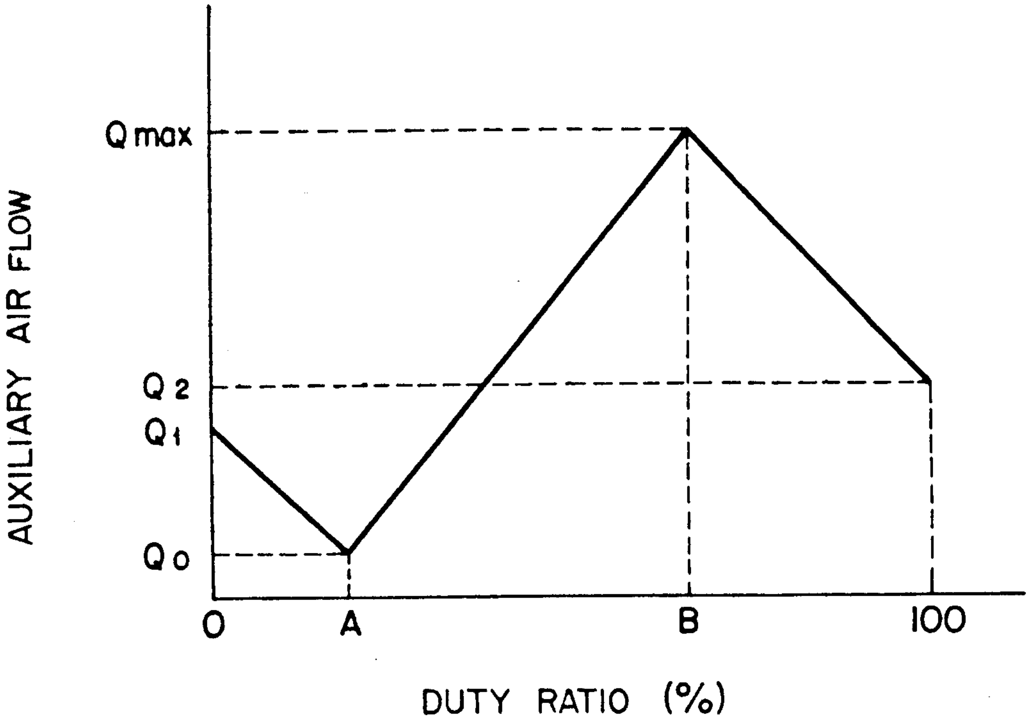
FIG. 15 is a graph showing characteristics of the duty ratio and an amount of the auxiliary air flow in accordance with the second embodiment.

FIG. 15 shows characteristics of an amount Q of the auxiliary air flow and the duty ratio. As is apparent from the characteristics shown in FIG. 15, under the condition that no voltage pulse is supplied due to a breakdown or the like of the signal line for supplying the voltage pulse, the valve body 90 is located at the position shown in FIG. 11, so that an amount Q of the auxiliary air flow to be supplied to the engine 100 is the auxiliary amount Q1. Also, when the maximum drive signal, i.e., the voltage pulse of the duty ratio of 100% is supplied to the engine due to a short-circuit or the like of the signal line for supplying the voltage pulse, the valve body 90 is located at the position shown in FIG. 14, and an amount Q of the auxiliary air flow to be supplied to the engine 100 is an amount Q2 of the auxiliary air flow. Also, under the normal idle control, the duty ratio is controlled between A% and B%.

Accordingly, even if the signal lines for supplying the voltage pulse suffers from an abnormality such as a short-circuit and a breakdown in the same manner as that of the first embodiment, an amount Q of the auxiliary air flow to be supplied to the engine 100 is not at the minimum amount Q0 of the auxiliary air flow or the maximum amount $Q_{max}$ of auxiliary air flow but is kept at the first or second amounts Q1, Q2 of the auxiliary air flows. Thus, even if the signal line for supplying the voltage pulse is broken down or short circuitted, it is possible to prevent the engine from stalling due to the decrease in RPM and to prevent the vehicle from running out of the control due to the increase in RPM.

Also, in the foregoing two embodiments, an amount Q1 of the first auxiliary air flow in the case where no drive signal is inputted and an amount Q2 of the second auxiliary air flow in the case where the maximum drive signal is inputted are kept under the relationship of Q1<Q2. However, if amounts Q1 and Q2 of the auxiliary air flows meet the foregoing conditions, it is possible to apply the invention even if Q1=Q2 or Q1<Q2.

As described in detail above, if the maximum drive signal is supplied to the drive means, a desired amount of the auxiliary air flow which is smaller than the maximum amount of the auxiliary air flow is supplied to the downstream side of the intake throttle valve. Accordingly, even if the system suffers from the abnormality in which the maximum drive signal would be continuously supplied to the drive means, the desired amount of the auxiliary air flow is supplied to the downstream portion of the intake throttle valve. It is therefore possible to prevent the vehicle from running out of the control due to the increase in RPM.

Furthermore, if no drive signal is supplied to the drive means, a desired amount of the auxiliary air flow is supplied to the downstream side of the throttle valve. Therefore, even if the system suffers from the abnormality in which no drive signal is supplied to the drive means, a predetermined amount of the auxiliary air flow is supplied on the upstream side of the intake throttle valve. It is possible to prevent the engine from stalling due to the decrease in RPM of the engine.

Also, the valve body is moved between the outlet port of the first bypass passage and the inlet port of the second bypass passage in accordance with the drive signal, thereby varying the opening areas of both the outlet port of the first bypass passage and the inlet port of the second bypass passage. Accordingly, if no drive signal is supplied to the drive means or if the maximum drive signal is supplied to the drive means, in order to keep the opening area for supplying the predetermined amount of the auxiliary air flow, it is unnecessary to provide any mechanical component.

If a drive signal smaller than a first predetermined level is supplied to the drive means, the smaller the drive signal, the larger an amount of the auxiliary air flow will become. Accordingly, even if such an abnormality that a drive signal smaller than the first predetermined level is inputted into the drive means, an amount of the auxiliary air flow to be supplied to the downstream side of the intake throttle valve is close to an amount of the auxiliary air flow corresponding to the first predetermined level. Thus, it is possible to prevent the engine from increasing its RPM.

Furthermore, if a drive signal larger than a second predetermined level is inputted into the drive means, the larger the drive signal, the smaller an amount of the auxiliary air flow will become. Accordingly, even if the drive signal exceeding the second predetermined level is inputted into the drive means, an amount of the auxiliary air flow to be supplied on the downstream side of the intake throttle valve is close to an amount of the auxiliary air flow corresponding to the second predetermined level. It is thus possible to prevent the engine from decreasing its RPM.

What is claimed is:

1. An engine idle control valve comprising:

first bypass passage means receiving auxiliary air flow, which bypasses an intake throttle valve of an engine and which is to be coupled to the engine, from an upstream side of an intake throttle valve disposed in an air intake pipe of the engine, and coupling said received auxiliary air to another port thereof;

second bypass passage means having an inlet port which is in communication with said outlet port of said first bypass passage means, receiving said auxiliary air flow introduced through said inlet port and coupling said received auxiliary air to a downstream side of said intake throttle valve;

a valve body for changing an opening area of at least one of said outlet port of said first bypass passage means and said inlet port of said second bypass passage means, thereby adjusting an amount of the auxiliary air flow to be introduced from the upstream side to the downstream side of said intake throttle valve; and drive means for driving said valve body in accordance with a drive signal such that when a maximum drive signal is input into said drive means, an opening area of at least one of said outlet port of said first bypass passage means and said inlet port of said second bypass passage means is throttled so that a first predetermined amount of the auxiliary air flow smaller than a maximum amount of the auxiliary air flow is introduced through said throttled opening area into the downstream side of said intake throttle valve.

2. A valve as in claim 1 wherein said drive means is an actuator.

3. The control valve according to claim 1, wherein, when no drive signal is inputted into said drive means, said valve body is driven so that the opening area of at least one of said outlet port of said first bypass passage means and said inlet port of said second bypass passage means is at a level at which a second predetermined amount of the auxiliary air flow may be introduced into the downstream side of said intake throttle valve.

4. The control valve according to claim 1 or 3, wherein said valve body is displaced towards said inlet port of said second bypass passage means to thereby change opening amounts of both the ports to adjust an amount of the auxiliary air flow.

5. The control valve according to claim 4, wherein said outlet port of said first bypass passage means and said inlet port of said second bypass passage means are juxtaposed with each other; and said valve portion of said valve body is reciprocated between said outlet port of said first bypass passage means and said inlet port of said second bypass passage means to thereby change a duty cycle of said opening amounts between said outlet port of said first bypass passage means and inlet port of said second bypass passage means.

6. The control valve according to claim 4, wherein said drive means comprises a rotary solenoid having a rotary shaft connected to an end, opposite to said valve portion, of said valve body, and said valve body is rotated in response to a magnitude of said drive signal.

7. The control valve according to claim 4, wherein said drive means comprises a linear solenoid for linearly moving said valve body in response to a magnitude of said drive signal.

8. The control valve according to claim 5, wherein said drive means is provided for driving said valve body in accordance with the drive signal changing continuously between first and second predetermined values smaller than the maximum drive signal to thereby adjust an amount of the auxiliary air flow; when said drive signal is at the first predetermined value for realizing the minimum amount of the auxiliary air flow, said valve portion of said valve body throttles only one of said outlet port of said first bypass passage means and said outlet port of said first bypass passage means and said outlet port of said second bypass passage means through which air flows to thereby determine the minimum amount of the auxiliary air flow; when said drive signal is at the maximum drive signal, said valve portion throttles only the other port through which air flows to thereby determine the predetermined value for realizing the maximum amount of the auxiliary air flow; when said drive signal is at the maximum drive signal, said valve portion throttles only the other through which air flows to thereby determine the predetermined amount of the auxiliary air flow; and when said drive signal is at the second predetermined value for realizing the maximum amount of the auxiliary air flow, said valve portion is between both said inlet and outlet ports such that said ports have minimum throttling to thereby determine the maximum amount of the auxiliary air flow.

9. The control valve according to claim 8, wherein a sectional area of one of said outlet port of said first bypass passage means and said inlet port of said second bypass passage means for determining said minimum amount of the auxiliary air flow is smaller than a projected area of said valve portion of said valve body.

10. The control valve according to claim 8, wherein, when a drive signal smaller than said first predetermined value is inputted into said drive means, said valve body is driven so as to increase an amount of the auxiliary air flow as the drive signal is smaller.

11. The control valve according to claim 8, wherein, when a drive signal larger than said second predetermined value is inputted into said drive signal, said valve body is driven so as to decrease an amount of the auxiliary air flow toward said predetermined amount of the auxiliary air flow as the drive signal is larger up to said maximum drive signal.

12. An engine idle control valve comprising:

first bypass passage means receiving auxiliary air flow, which bypasses an intake throttle valve of an engine and which is to be coupled to the engine from an upstream side of an intake throttle valve disposed in an air intake pipe of the engine and coupling said received auxiliary air to an outlet port thereof;

second bypass passage means having an inlet port which is in communication with said outlet port of said first bypass passage means, receiving said auxiliary air flow introduced through said inlet port and coupling said received auxiliary air flow to a downstream side of said intake throttle valve;

a valve body for changing an opening area of at least one of said outlet port of said first bypass passage means and said inlet port of said second bypass passage means, thereby adjusting an amount of the auxiliary air flow to be introduced from the upstream side to the downstream side of said intake throttle valve; and an actuator for driving said valve body to a position responsive to an applied drive signal to said actuator such that when a maximum drive signal is inputted into said drive means, an opening area of at least one of said outlet port of said first bypass passage means and said inlet port of said second bypass passage means is throttled so that a first predetermined amount of the auxiliary air flow, smaller than a maximum amount of the auxiliary air flow, is introduced through said throttled opening area to the downstream side of said intake throttle valve.

13. The control valve according to claim 12, wherein said actuator drives said valve body to a position when no drive signal is inputted where an opening area of said outlet port of said first bypass passage means and said inlet port of said second bypass passage means is throttled so that a second predetermined amount of the auxiliary air flow larger than a minimum amount of the auxiliary air flow is introduced into the downstream side of said intake throttle valve.

14. The control valve according to claim 12, wherein said outlet port of said first bypass passage means and said inlet port of said second bypass passage means are juxtaposed with each other; and said valve portion of said valve body is reciprocatingly moved between said outlet port of said first bypass passage means and said inlet port of said second bypass passage means to thereby change the opening amount between said outlet port of said first bypass passage means and said inlet port of said second bypass passage means.

15. The control valve according to claim 12, wherein said actuator includes a rotary solenoid having a rotary shaft connected to an end, opposite to the valve portion, of said valve body, for rotating said valve body in response to a magnitude of the drive signal, said rotary solenoid including a first coil for generating a magnetic field for driving said valve body in a fully opening direction, and a second coil for generating a magnetic field for driving said valve body in a fully closing direction, said valve body being controlled to a predetermined position in response to a ratio of voltages supplied to said first and second coils.

16. The control valve according to claim 15, wherein, when one of signal lines for supplying voltage to said first and second coils is broken, said actuator drives said valve body in a drive direction by the other coil.

17. The control valve according to claim 15, wherein when one of signal lines for supplying voltage to said first and second coils is short-circuitted, said actuator drives said valve body in a direction by the coil.

18. The control valve according to claim 13 or 2, wherein said actuator includes:

A solenoid for moving said valve body between said outlet port of said first bypass passage means and said inlet port of said second bypass passage means in response to said drive signal;

a fully closing stopper for limiting said valve body to a first predetermined position when no drive signal is inputted, said first predetermined position being one in which an amount of air flow is said second predetermined amount;

a fully opening stopper for limiting said valve body to a second predetermined position when said maximum drive signal is inputted, said second predetermined position being one in which an amount of air flow is said first predetermined amount; and a spring for biasing said valve body in a constant direction.

19. The control valve according to claim 18, wherein when the signal line for supplying the drive signal to said solenoid is broken, said valve body is driven by a biasing force of said spring.

20. The control valve according to claim 12 or w, wherein said actuator is provided for driving said valve body in accordance with the drive signal changing continuously between first and second predetermined values smaller than the maximum drive signal to thereby adjust an amount of the auxiliary air flow; when said drive signal is at the first predetermined value for allowing the minimum amount of the auxiliary air flow, said air valve portion of said valve body throttles only one of said outlet port of said first bypass passage means and said outlet port of said second bypass passage means to thereby determined the minimum amount of the auxiliary air flow through said throttles opening area; when said drive signal is at the maximum drive signal, said valve portion throttles only the other to thereby determine the predetermined amount of the auxiliary air flow through said throttled opening area; and when said drive signal is at a second predetermined value for realizing the maximum amount of the auxiliary air flow, said valve portion is between said inlet and outlet ports to thereby determine the maximum amount of the auxiliary air flow.

21. The control valve according to claim 20, wherein a sectional area of one of said outlet port of said first bypass passage means and said inlet port of said second bypass passage means for determining said minimum amount of the auxiliary air flow is smaller than a projected area of said valve portion of said valve body.

22. The control valve according to claim 20, wherein, when a drive signal smaller than said first predetermined value is inputted into said drive means, said valve body is driven so as to increase an amount of the auxiliary air flow as the drive signal is smaller.

23. The control valve according to claim 20, wherein, when a drive signal larger than said second predetermined value is inputted into said drive signal, said valve body is driven so as to decrease an amount of the auxiliary air flow toward said predetermined amount of the auxiliary air flow as the drive signal is larger up to said maximum drive signal.

24. An engine idle control valve comprising:

first bypass passage means receiving auxiliary air flow, which bypasses an intake throttle valve of an engine and which is to be coupled to the engine, from an upstream side of an intake throttle valve disposed in an air intake pipe of the engine, and coupling said received auxiliary air to another port thereof;

second bypass passage means having an inlet port which is in communication with said outlet port of said first bypass passage means, receiving said auxiliary air flow introduced through said inlet port and coupling said received auxiliary air to a downstream side of said intake throttle valve;

a valve body for changing an opening area of at least one of said outlet port of said first bypass passage means and said inlet port of said second bypass passage means, thereby adjusting an amount of the auxiliary air flow to be introduced from the upstream side to the downstream side of said inlet throttle valve; and an actuator for driving said valve body so that a maximum movement position of said valve body corresponds to an area where a first predetermined amount of the auxiliary air flow, smaller than a maximum amount of the auxiliary air flow is introduced into the downstream side of said intake throttle valve through an opening area of at least one of said outlet port of said first bypass passage means and said inlet port of said second bypass passage means, and a minimum movement position of said valve body corresponds to an area where a second predetermined amount of the auxiliary air flow larger than a minimum amount of the auxiliary air flow is introduced into said downstream side of said throttle valve through an opening area of at least one of said outlet port of said first bypass passage means and said inlet port of said second bypass passage means.

25. An engine idle control valve comprising:

first bypass passage means receiving auxiliary air flow, which bypasses an intake throttle valve of an engine and which is to be coupled to the engine, from an upstream side of an intake throttle valve disposed in an air intake pipe of the engine, and coupling said received auxiliary air to another port thereof;

second bypass passage means having an inlet port which is in communication with said outlet port of said first bypass passage means, receiving said auxiliary air flow introduced through said inlet and coupling said received auxiliary air to a downstream side of said intake throttle valve;

a valve body for changing an opening area of at least one of said outlet port of said first bypass passage means and said inlet port of said second bypass passage means, thereby adjusting an amount of auxiliary air flow to be introduced from the upstream side to the downstream side of said intake throttle valve; and an actuator for driving said valve body to a position where, when a maximum drive signal is inputted into said drive means, the opening area of at least one of said outlet port of said first bypass passage means and said inlet port of said second bypass passage means is throttled so that a first predetermined amount of the auxiliary air flow, smaller than a maximum amount of the auxiliary air flow is introduced into the downstream side of said intake throttle valve through said throttled port; and electronic control means for controlling the drive signal to be supplied to said actuator so as to maintain the RPM of said engine at a predetermined value.

26. A valve as in any of claim 1, 12, 24 or 25 wherein when said maximum drive signal is lowered by a predetermined amount, the opening area of at least one of said outlet port of said first bypass passage means and said inlet port of said second bypass passage means is sealed, so that only a leakage amount of air will flow therethrough.

* * * * *